Jan. 15, 1935. O. EPPENSTEIN 1,987,773
INSTRUMENT FOR MEASURING PARALLEL COORDINATES
Filed Oct. 19, 1933

Inventor:
Otto Eppenstein

Patented Jan. 15, 1935

1,987,773

UNITED STATES PATENT OFFICE 1,987,773

INSTRUMENT FOR MEASURING PARALLEL COORDINATES

Otto Eppenstein, Jena, Germany, assignor to the firm Carl Zeiss, Jena, Germany

Application October 19, 1933, Serial No. 694,287
In Germany October 22, 1932

3 Claims. (Cl. 33—185)

The present invention, which concerns instruments the construction of which is based on the comparator principle, relates to an improvement in the known instruments for determining the parallel coordinates of points in a plane surface, or for finding the positions of points in the surface through the medium of given coordinates, these determinations being effected by means of two rules which are parallel to the axial directions of a coordinate system and whose division lines intersect each other at one point. According to the invention, the said improvement may be attained by connecting the surface to be measured, which is displaceable relatively to the point of intersection of the said division lines in a direction approximately parallel to the two axial directions, to two sighting devices whose sighting lines are approximately parallel to it and at right angles to the axial directions of the coordinate system. Similar advantages are naturally offered by an instrument in which kinematic reversion provides that the rules are displaceable and that the plane to be measured is stationary. On account of the obtainable great adjusting and reading accuracy, the instrument is to be equipped especially with optical observation devices, for instance microscopes or telescopes, which may be focused to suit different distances of observation, the focusing points lying in a straight line. The division lines on the rules may have any positions, provided that the aiming points, which are determined by the positions of the sighting devices, lie in a plane parallel to the plane of the surface to be measured. The division lines are conveniently provided on those surfaces of the rules which are at right angles to the plane of the surface to be measured. The instrument may be constructed either for use with a rectangular or an oblique-angled system of parallel coordinates.

Figure 1:
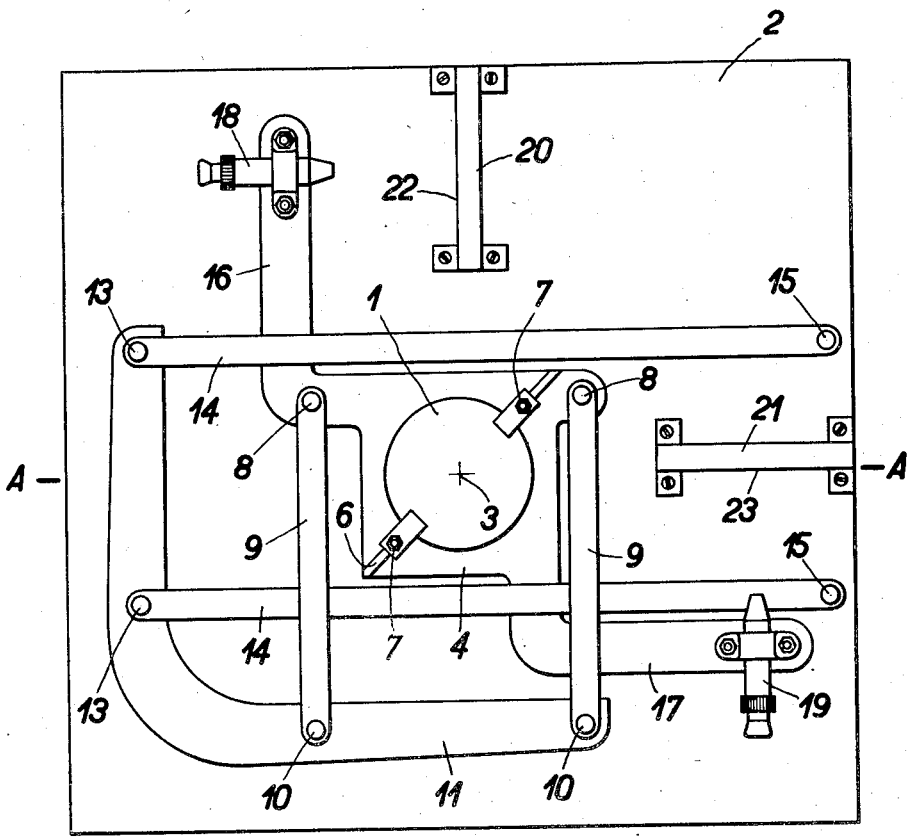
Figure 2:
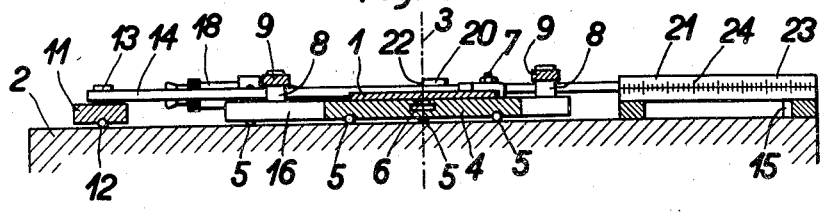

In the accompanying drawing, which illustrates the invention, Figure 1 represents a constructional example in plan view and Figure 2 shows a section through the line A—A in Figure 1 in elevation.

The example is meant to solve the problem of providing a circular template 1 by means of a drilling machine with holes whose coordinates are given by a rectangular system of parallel coordinates referring to the centre of the hole template. 2 is the drilling-machine table and 3 represents the axis of the drilling-machine spindle.

The instrument has a plate 4 which is displaceably mounted on balls 5 resting on the table 2. The plate 4 is provided with T-shaped slits 6 for screws 7 and supports two bolts 8 about which may be rotated links 9 of equal lengths. The other ends of these links 9 are connected to bolts 10 which are fixed to one side piece of an angle plate 11 displaceably mounted on the table 2 by means of balls 12. The other side piece of the angle plate 11 has bolts 13 about which are rotatable links 14 of equal lengths, the other ends of these links 14 being connected to bolts 15 fixed to the table 2. The links 9 and 14 and the angle plate 11 represent a parallel guide for the plate 4, and this plate 4 may therefore be displaced on the table 2 parallel to itself and in two directions at right angles to each other. The plate 4 has, moreover, two arms 16 and 17 to which telescopes 18 and 19, respectively, are so attached that their optical axes intersect each other at right angles and lie in a plane parallel to a hole template 1 placed on the plate 4. The telescopes 18 and 19 may be focused to suit different distances of observation, the focusing points lying in a plane parallel to the surface of the plate 4. Furthermore, the instrument has two rules 20 and 21 which are so attached to the table 2 that one each of their surfaces is at right angles to the optical axis of one of the telescopes, the surface 22 of the rule 20 and the surface 23 of the rule 21 being at right angles to the optical axis of the telescope 18 and that of the telescope 19, respectively. The surfaces 22 and 23 have scales 24 whose division lines are intersected by the plane determined by the optical axes of the two telescopes at points which serve as focusing points for the telescopes and which, therefore, represent two scales in a plane parallel to the surface of the hole template 1 on the plate 4. The elongations of these scales intersect each other in the axis 3 of the spindle.

When using the instrument, the template 1 is to be secured to the plate 4 by means of the screws 7 and to be so adjusted by displacing the plate 4 on the table 2 that the centre of the template 1 lies at the point which is determined by that point of the axis 3 of the spindle at which the elongations of the two scales 24 intersect each other. When the plate 4 assumes this position, the division lines corresponding to the positions of the two telescopes 18 and 19 are read on the scales 24 by means of these two telescopes. The said values represent the coordinates of the centre of the template 1. Subsequently thereto, the plate 4 is to be so displaced as to have the telescopes 18 and 19 adjusted to the division lines of the coordinates which correspond to the algebraic sums of one each of the coordinates of the centre and the corresponding given coordinate of a hole to be drilled into the template 1, in which case the axis 3 of the spindle coincides with the axis of the desired hole, which may now be drilled. The positions of the axes of the other holes to be drilled into the template 1 are to be determined in the same manner. Reversely, when it is desired to determine the coordinates of a point on the template 1, the plate 4 is to be displaced until this point lies in the axis 3 of the spindle, when the appertaining coordinate values may be read on the scales 24 by means of the telescopes 18 and 19, these values having to be reduced by the values of the coordinates of the centre of the template 1.

I claim:

1. An instrument for measuring parallel coordinates, comprising a base plate, a support for the object to be measured, means so connecting the support to the base plate as to make this support displaceable only parallel to itself, two rules so disposed on the base plate as to be parallel to the two coordinate directions, and two sighting devices connected to the said support, the two sighting lines of these sighting devices being approximately at right angles to the two rules, respectively.

2. An instrument for measuring parallel coordinates, comprising a base plate, two links of equal lengths which are parallel to each other, the one ends of these links being rotatably mounted on the base plate, an intermediate piece, the other ends of the said links being mounted on this intermediate piece, two other links of equal lengths which are parallel to each other, the one ends of these other links being rotatably mounted on the intermediate piece, a support for the object to be measured, the other ends of the said two other links being rotatably mounted on the said support, two rules so disposed on the base plate as to be parallel to the two coordinate directions, and two sighting devices connected to the said support, the two sighting lines of these sighting devices being approximately at right angles to the two rules, respectively.

3. An instrument for measuring parallel coordinates, comprising a base plate, a support for the object to be measured, means so connecting the support to the base plate as to make this support displaceable only parallel to itself, two rules so disposed on the base plate as to be parallel to the two coordinate directions, and two optical observation instruments connected to the said support, the two sighting lines of these observation instruments being approximately at right angles to the two rules, respectively, the said observation instruments being adapted to permit the reading of the rules at different distances.

OTTO EPPENSTEIN.